United States Patent
Lin et al.

(10) Patent No.: US 9,789,665 B2
(45) Date of Patent: Oct. 17, 2017

(54) ALKALI-ALUMINOSILICATE GLASS

(71) Applicant: Taiwan Glass Ind. Corp., Taipei (TW)

(72) Inventors: Chia-Hung Lin, Tai-Chung (TW); Sven Wiltzsch, Jena (DE); Lars Bienneck, Jena (DE); Gunter Carl, Rothenstein (DE); Hans-Juergen Linz, Weimar (DE)

(73) Assignee: Taiwan Glass Inc. Corp., Taipei (TW)

( * ) Notice: Subject to any disclaimer, the term of this patent is extended or adjusted under 35 U.S.C. 154(b) by 0 days.

(21) Appl. No.: 14/540,684

(22) Filed: Nov. 13, 2014

(65) Prior Publication Data

US 2015/0132570 A1    May 14, 2015

(30) Foreign Application Priority Data

Nov. 13, 2013 (DE) .......... 10 2013 019 003

(51) Int. Cl.
*C03C 21/00* (2006.01)
*C03C 3/085* (2006.01)
*C03C 3/095* (2006.01)
*B32B 17/00* (2006.01)

(52) U.S. Cl.
CPC .............. *B32B 17/00* (2013.01); *C03C 3/085* (2013.01); *C03C 3/095* (2013.01); *C03C 21/002* (2013.01); *B32B 2457/20* (2013.01); *Y10T 428/26* (2015.01)

(58) Field of Classification Search
None
See application file for complete search history.

(56) References Cited

U.S. PATENT DOCUMENTS

| | | | | |
|---|---|---|---|---|
| 2,779,136 A | * | 1/1957 | Stookey et al. | 428/410 |
| 3,485,647 A | * | 12/1969 | Harrington | 501/63 |
| 3,485,702 A | * | 12/1969 | Mochel | 428/336 |
| 3,524,737 A | * | 8/1970 | Doyle et al. | 65/30.14 |
| 3,752,729 A | * | 8/1973 | Mochel et al. | C03C 3/078 |
| | | | | 428/218 |
| 8,075,999 B2 | | 12/2011 | Barefoot et al. | |
| 2011/0017297 A1 | * | 1/2011 | Aitken | C03C 3/085 |
| | | | | 136/260 |
| 2011/0045961 A1 | * | 2/2011 | Dejneka et al. | 501/66 |
| 2012/0083401 A1 | * | 4/2012 | Koyama | C03C 3/085 |
| | | | | 501/70 |
| 2012/0171497 A1 | * | 7/2012 | Koyama | C03C 3/085 |
| | | | | 428/428 |
| 2012/0297829 A1 | * | 11/2012 | Endo | C03C 3/085 |
| | | | | 65/30.14 |
| 2012/0321898 A1 | | 12/2012 | Meinhardt et al. | |
| 2013/0004758 A1 | * | 1/2013 | Dejneka et al. | 428/220 |
| 2013/0122284 A1 | * | 5/2013 | Gross | C03C 3/04 |
| | | | | 428/336 |
| 2013/0224491 A1 | * | 8/2013 | Smedskjaer et al. | 428/410 |
| 2013/0288001 A1 | * | 10/2013 | Murata | C03C 3/085 |
| | | | | 428/141 |
| 2014/0226090 A1 | * | 8/2014 | Akiba | C03C 3/085 |
| | | | | 349/12 |

FOREIGN PATENT DOCUMENTS

| | | | | |
|---|---|---|---|---|
| CN | 1391538 A | | 1/2003 | |
| CN | 101508524 A | | 8/2009 | |
| GB | 1177248 A | * | 1/1970 | .......... C03C 21/002 |
| JP | WO 2012099053 A1 | * | 7/2012 | ............. C03C 3/085 |
| JP | 2013177305 A | | 9/2013 | |
| WO | WO2013073685 A2 | * | 5/2013 | |
| WO | 2013130646 A1 | | 9/2013 | |

OTHER PUBLICATIONS

Taylor et al., "Properties of Soda Aluminosilicate Glasses: V, Low-Temperature Viscosities," Journal of the American Ceramic Society, vol. 53, No. 12, p. 692-695, Dec. 1970.*
State Intellectual Property Office of the People's Republic of China, First Office Action Issued in Application No. 201410638271.X, Jul. 4, 2016, 11 pages. (Submitted with Partial Translation).

* cited by examiner

*Primary Examiner* — David Sample
(74) *Attorney, Agent, or Firm* — McCoy Russell LLP

(57) ABSTRACT

The present disclosure relates to an alkali-aluminosilicate glass which contains between 47.5 and 55 wt.% $SiO_2$, between 21 and 27.5% $Al_2O_3$; and between 12 and 16 wt.% $Na_2O$. The molar ratio of $Al_2O_3$ and $Na_2O$ amounts to between 1:0.9 and 1:1.2. This glass is characterized by high hardness and high surface strengths after its chemical toughening, whereby the resulting extremely high scratch resistance favors its use as a display glass. A further preferred feature of this glass is its much lower viscosity for this group of glasses.

18 Claims, 1 Drawing Sheet

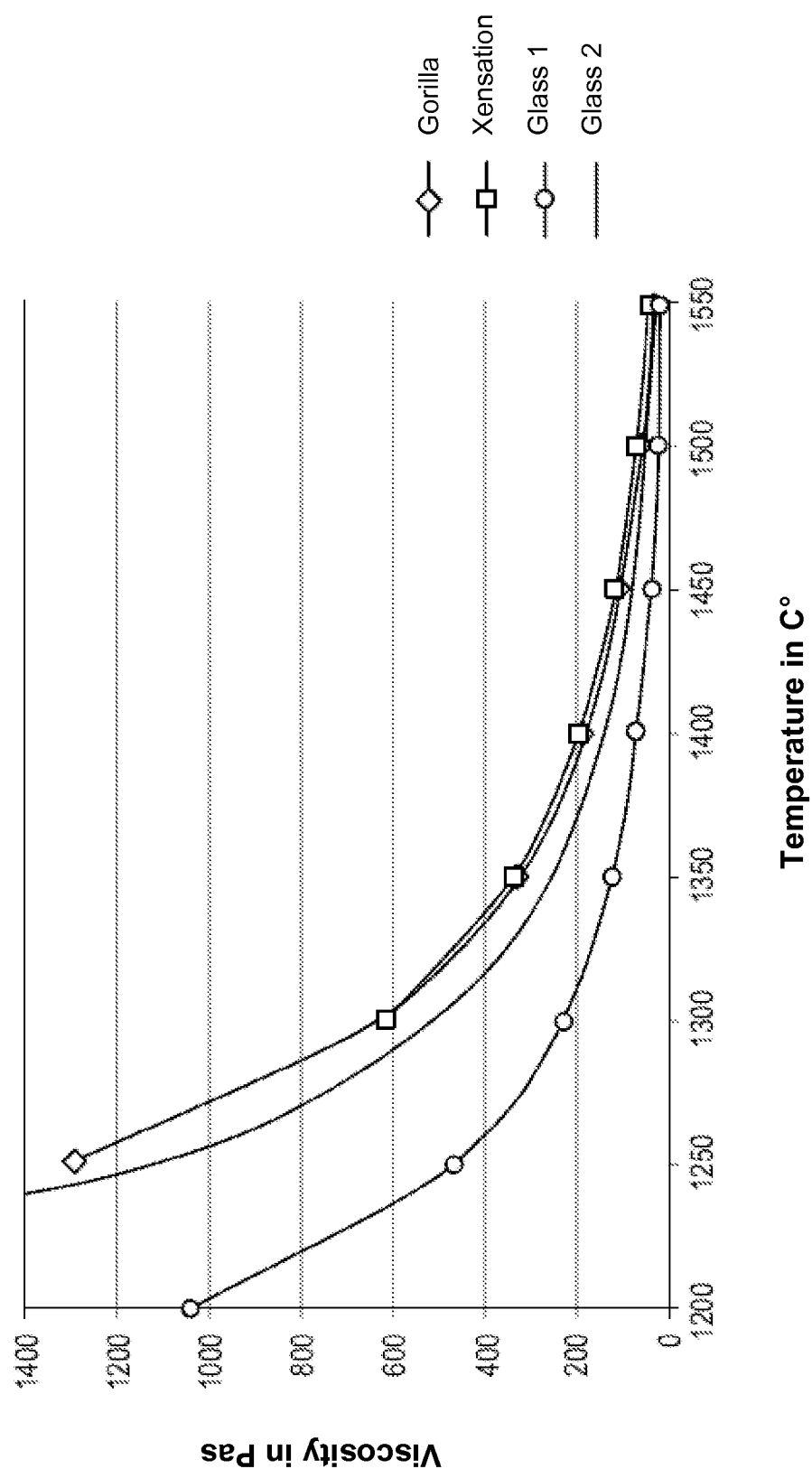

ALKALI-ALUMINOSILICATE GLASS

CROSS REFERENCE TO RELATED APPLICATION

This application claims priority to German Patent Application No. 10 2013 019 003.7, entitled "Alkali-Aluminosilicate Glass," filed Nov. 13, 2013, which is hereby incorporated by reference in its entirety for all purposes.

TECHNICAL FIELD

The present disclosure relates to an alkali-aluminosilicate glass, to an article comprising or consisting of such a glass as well as to the use of such a glass article as a cover glass for displays in electrical devices, a safety glass or as toughened optical glass.

BACKGROUND AND SUMMARY

It is known in the prior art to use glasses having a chemically hardened surface, for example, as a scratch-resistant cover glass for displays in electrical devices. The chemical hardening of the glasses typically takes place by dipping a plate of the non-hardened glass into a salt bath. In this respect, an exchange of smaller ions (e.g. Na+) in the glass with larger ions (e.g. K+) from the salt bath takes place by diffusion in the regions of the plate close to the surface. The strength and the internal tension of the material in the diffusion layer is increased by the increased space requirements of the larger ions.

DE 10 2010 009 584 A1, for example, discloses a lithium-aluminosilicate glass at which a surface toughening first takes place by an exchange of lithium ions with sodium ions and in a second step by the exchange of sodium ions with potassium ions. A further chemically hardened glass having up to 20 mass % $Al_2O_3$ is disclosed in U.S. Pat. No. 8,075,999 B2.

It is the aim of the present disclosure to provide a glass which is suitable for a chemical hardening and which has improved properties.

This aim is achieved by an alkali-aluminosilicate glass which contains between 47.5 wt. % and 55 wt. % $SiO_2$ and between 21 and 27.5 wt. % $Al_2O_3$. The glass furthermore contains between 12 and 16 wt. % sodium oxide $Na_2O$. The molar ratio of $Al_2O_3$ to $Na_2O$ in the glass amounts to between 0.9:1 and 1.2:1.

Preferred ranges for the portion of $SiO_2$ comprise between 50 and 55 wt. % and in particular between 53 and 55 wt. %. Preferred ranges for the portion of $Al_2O_3$ comprise between 21 and 25 wt. % and in particular between 21.5 and 23.5 wt. %. Preferred ranges for the portion of $Na_2O$ comprise between 13 and 16 wt. % and in particular between 13.8 and 15.6 wt. %.

In an embodiment, the molar ratio of $Al_2O_3$ to $Na_2O$ in the glass amounts to between 0.94:1 and 1.1:1.

In an embodiment, the molar ratio of $SiO_2$ to $Al_2O_3$ in the glass amounts to between 2.5:1 and 4.8:1, preferably to between 3.5:1 and 4.5:1, and further preferably to between 3.9:1 and 4.2:1.

In an embodiment, the glass in accordance with the present disclosure comprises $K_2O$, preferably between 1.5 and 2.5 wt. % $K_2O$. In an embodiment, the glass in accordance with the present disclosure comprises $Li_2O$, preferably up to 1.5 wt. % $Li_2O$.

The glass in accordance with the present disclosure already has a greater hardness in the untreated state, i.e. in the not yet chemically hardened state, over other chemically hardenable alkali-aluminosilicate glasses. The glass in accordance with the present disclosure in the process of chemical toughening is furthermore characterized by a fast exchange speed and a considerable strength gain in the diffusion zone. There is no disadvantage in scratch-resistance with respect to known glasses having higher diffusion depths of the hardened layer due to the high base value of the hardness and the good properties during the chemical hardening, even with small dwell times in the salt bath with resulting thin diffusion layers. The glass already has a surface hardness before hardening, for example, of between 6400 MPa and 6600 MPa.

In an embodiment, the glass in accordance with the present disclosure is free of Ca or CaO. This can inter alia be advantageous with respect to the exchange rate of the sodium ions during chemical hardening.

In an embodiment, the glass in accordance with the present disclosure contains between 4 and 10 wt. %, preferably between 4 and 8 wt. %, and further preferably between 4.5 and 6 wt. % MgO. This can inter alia be advantageous with respect to the strength of the hardened surface layer. It is assumed that MgO has a network-strengthening effect in the region of the diffusion zone in the named concentration ranges.

In an embodiment, the glass in accordance with the present disclosure contains up to 1 wt. %, and preferably between 0.3 and 0.5 wt. % $SnO_2$. In an embodiment, the glass in accordance with the present disclosure contains up to 0.6 and preferably up to 0.2 wt. % $CeO_2$. In an embodiment, the glass in accordance with the present disclosure contains up to 1% F. These components can inter alia serve as fining means during the production of the glass.

In an embodiment, the glass in accordance with the present disclosure contains between 1.8 and 3.5 wt. %, and preferably between 2 and 2.5 wt. % $ZrO_2$. In an embodiment, the aluminosilicate glass in accordance with the present disclosure contains between 0.2 and 3.5 wt. % ZnO.

The present disclosure further relates to a glass article comprising or consisting of an alkali-aluminosilicate glass in accordance with the present disclosure. The glass article can, for example, be produced solely from the glass in accordance with the present disclosure or can have zones, for example layers, of the glass in accordance with the present disclosure.

In an embodiment, the alkali-aluminosilicate glass of the glass article is chemically hardened at least sectionally at its surface and has a diffusion layer at least sectionally at its surface. In the diffusion layer, the concentration of Na is lowered with respect to the untreated glass composition and the concentration of another element, for example K, is increased with respect to the untreated glass composition. The diffusion layer can be achieved by a chemical hardening process, with the glass article being dipped into a salt bath, for example a bath of molten $KNO_3$, at specific temperatures and dwell times.

In an embodiment, the diffusion layer is between 10 μm and 60 μm thick, preferably between 15 μm and 35 μm thick, and further preferably between 20 μm and 30 μm thick. The layer thickness depends on the dwell time or on the temperature in the salt bath. The border between the diffusion layer and the remaining glass is to be drawn where there is a measurable difference in the concentration of Na with respect to the untreated glass composition.

In an embodiment, the glass article is a glass pane which is either manufactured homogeneously from the glass in accordance with the present disclosure or has at least one layer of the glass in accordance with the present disclosure. In this case, one or both oppositely disposed surfaces of the pane can be chemically hardened. The pane or layer of the glass in accordance with the present disclosure can be between 0.4 mm and 2 mm thick.

The present disclosure further relates to the use of such a glass pane as a component of electronic devices, in particular as a cover glass for displays, optionally with a touch screen. Suitable electronic devices in particular comprise cell phones or smart phones and computers or tablet computers.

Further details and advantages result from the following FIGURE and from the embodiments.

BRIEF DESCRIPTION OF THE FIGURE

FIG. 1 shows measured viscosity curves of glasses in accordance with the present disclosure in comparison with glasses from the prior art in the temperature range between 1200° C. and 1550° C.

DETAILED DESCRIPTION

Embodiment 1

A batch of suitable starting materials was melted, homogenized, fined and left to stand in a glass furnace to obtain a glass having the following composition:
53.8 wt. % $SiO_2$;
21.9 wt. % $Al_2O_3$;
5.7 wt. % MgO;
14 wt. % $Na_2O$;
1.9 wt. % $K_2O$;
2.2 wt. % $ZrO_2$;
0.4 wt. % $SnO_2$; and
0.1 wt. % $CeO_2$.

A block was subsequently cast and fine annealed. In a further sequence, panes of the glass in accordance with the present disclosure, which is called Glass 1 in the following, were produced from this block by cutting, grinding and polishing.

Embodiment 2

A batch of suitable starting materials was melted, homogenized, fined and left to stand in a glass furnace to obtain a glass having the following composition
53.8 wt. % $SiO_2$;
22.9 wt. % $Al_2O_3$;
4.7 wt. % MgO;
14 wt. % $Na_2O$;
1.9 wt. % $K_2O$;
2.2 wt. % $ZrO_2$;
0.4 wt. % $SnO_2$; and
0.1 wt. % $CeO_2$.

A block was subsequently cast and fine annealed. In a further sequence, panes of the glass in accordance with the present disclosure, which is called Glass 2 in the following, were produced from this block by cutting, grinding and polishing.

With respect to embodiment 1, the portion of $Al_2O$ was therefore increased by 1 wt. % and the portion of MgO was decreased by 1 wt. % in the glass composition.

Embodiment 3

The glasses 1 and 2 were chemically hardened by dipping in a salt bath of molten $KNO_3$ at 430° C. for 4 h. In this respect, a diffusion of Na ions from the glass into the salt melt and of K ions from the salt melt into the glass took place. A 20 µm thick diffusion layer formed at the surface of the panes in this respect.

The following Table 1 contains measured property values of the glasses 1 and 2 and the corresponding properties of the "Gorilla" brand glass from the manufacturer Corning which is used as a cover glass for displays of the iPhone, for example.

TABLE 1

| Property | Glass 1 | Glass 2 | Gorilla |
|---|---|---|---|
| Refractive index | 1.522 | | 1.509 |
| Density [g/cm³] | 2.52 | | 2.44 |
| Coeff. of linear thermal expansion (20 to 300° C. [10−6/K] | 8.67 | | 8.27 |
| Fixed viscosity points [° C.] | | | |
| Transformation temperature [° C.] | 668 | | 619 |
| Viscosity value [° C.] for log η = 6.6 (η in Pa · s) | 891 | | 843 |
| Viscosity value [° C.] for log η = 3.0 (η in Pa · s) | 1210 | 1260 | 1275 |
| Viscosity value [° C.] for log η = 2.0 (η in Pa · s) | 1390 | 1450 | 1500 |
| Viscosity value [° C.] for log η = 1.0 (η in Pa · s) | 1615 | 1680 | 1730 |
| Liquidus temperature [° C.] | 1260 | 1220 | |
| Vickers hardness (DIN 50 133-2) [MPa] | | | |
| Before chem. hardening | 6465 | 6550 | 5915 |
| After chem. hardening | 7112 | 7200 | 6330 |
| Mechanical values (before chem. hardening) | | | |
| Transverse contraction number | 0.2 | | 0.2 |
| Shear modulus [GPa] | 32 | | 30 |
| Compression modulus [GPa] | 43 | | 39 |
| Young's modulus [GPa] | 77 | | 72 |
| Strength values (after chem. hardening) [MPa] | | | |
| Surface strength as per the double ring method (430° C./4 h) | 1246 | 1260 | 950 |

TABLE 1-continued

| Property | Glass 1 | Glass 2 | Gorilla |
|---|---|---|---|
| Surface strength (CS), optically measured (440° C./4 h) | 1156 | | 900 |
| Surface strength (SC) (mathematical model) | 1216 | | 878 |
| Chemical resistance (before chem. hardening) | | | |
| Hydrolytic resistance as per DIN ISO 719 [µg] | 70 | 43 | 42 |

With respect to the viscosity properties and the crystallization properties, it can be seen from the measured values that the temperatures for the fixed viscosity points in the melting and processing range for the glasses in accordance with the present disclosure lie at significantly lower temperatures in comparison with the Gorilla glass.

It must be stated for the optimum fining range with viscosities of log η=1 to 2 that the glass 1 reaches a viscosity of log η=1 at a temperature which is 115 K lower than with Gorilla glass. For log η=2, the temperature difference amounts to 110 K. With glass 2, the values are 50 K (log η=1 and 2) lower than with Gorilla glass. Overall, the glasses in accordance with the present disclosure therefore have a log η of 2 [Pa·s] at a temperature of ≤1450° C. A mean fining temperature lowering with respect to the comparison glass of 50 to 100 K in the viscosity range between 10 and 100 Pa·s is therefore generally to be assumed.

There is therefore a temperature reserve in the manufacture which can be utilized in different manners. Examples for the utilization of the temperature reserve comprise a utilization for energy saving, a utilization for lowering the strain of the refractory material, a utilization for improving the quality and yield, or a utilization for increasing the specific melting performance.

In the FIGURE, measured viscosity curves of the glasses 1 and 2 in accordance with the present disclosure compared with the Gorilla glass and of the brand glass "Xensation" of Schott AG, which is used as a cover glass for displays of smart phones, are shown. The temperature range shown lies between 1200° C. and 1550° C. As can be seen from the FIGURE, the viscosity of the glasses in accordance with the present disclosure is much lower in the total temperature range than that of the glasses of the prior art.

Glasses 1 and 2 are furthermore suitable for an application in float processing. As can be seen from Table 1, in particular the liquidus temperature of glass 2 (1220° C.) is below the temperatures which characterize the floating processing range between 400 Pa·s and 800 Pa·s (log η is 2.6 to 2.9). A safety interval of more than 50° C. is given here in the case of glass 2. Glass 1 does not have a safety interval, but no crystallization was able to be found in the temperature range in question as part of the prior examinations of fine annealed, cast blocks.

As regards the mechanical properties, it can be recognized from the table that the glasses in accordance with the present disclosure already have an approximately 10% higher Vickers hardness in the chemically non-hardened state than the comparison glass. This difference additionally becomes noticeable on the hardening under comparable diffusion depths of (20 µm for glasses 1 and 2; 30 µm for the Gorilla glass) since the value on the chemical toughening for the glasses in accordance with the present disclosure increases by around 10%, while the relative hardness increase, and also the absolute hardness increase, is lower in the comparison glass.

In addition, the glasses in accordance with the present disclosure have a higher surface strength. It was determined in the double ring measurement in accordance with DIN 1288-5 that the surface strength of the hardened glasses is 30% higher than that of the Gorilla glass. In order also to take account of the lower diffusion depth for the glasses in accordance with the present disclosure with respect to the Gorilla glass in the comparison (20 µm for glasses 1 and 2; 30 µm for the Gorilla glass), optical measurements were thereupon made using the refractive index method with comparable thicknesses of the diffusion layers. For this purpose, glass 1 in an alternative embodiment was chemically hardened by dipping into a salt bath of liquid KNO3 at 440° C. for 4 h. In this respect, a diffusion layer having a thickness of 30 µm resulted. The numerical values listed accordingly in the table here also confirm the considerably higher surface strength.

This means that even at lower diffusion depths and thus lower, and so more economic, dwell times in the salt bath no disadvantages are to be expected in the scratch resistance with respect to known glasses.

As noted herein, a system may comprise an electronic device, such as a cell phone or computer, the device having a screen acting as a display for the device, with one or more of an LCD and/or plasma matrix positioned behind the screen. The screen may be rectangularly shaped, curved, flat, and/or combinations thereof. The screen may be a glass article, such as a glass article consisting of a glass comprising between 47.5 and 55 wt. % SiO2; between 21 and 27.5 wt. % Al2O3; and between 12 and 16 wt. % Na2O; and in that the a molar ratio of Al2O3 to Na2O lies between 0.9:1 and 1.2:1, wherein the glass has a diffusion layer at least sectionally at its surface, wherein a K content of the glass is increased with respect to a base composition and the Li content and Na content of the glass are lowered with respect to the base composition.

The invention claimed is:

1. A glass, comprising between 47.5 and below 55 wt. % SiO2; between 21 and 27.5 wt. % Al2O3; and between 12 and 16 wt. % Na2O; and in that a molar ratio of Al2O3 to Na2O lies between 0.94:1 and 1.1:1; wherein the glass is free of CaO; wherein the glass includes between 4.5 and 6 wt. % MgO; wherein the glass contains between 1.5 and 2.5 wt. % K2O; wherein the glass contains between >0 and 1 wt. % SnO2; wherein the glass contains between >0 and 0.6 wt. % CeO2; wherein the glass contains between 1.8 and 3.5 wt. % ZrO2; and wherein the glass has a pre-hardening Vickers hardness of between 6400 and 6600 MPa.

2. The glass in accordance with claim 1, wherein the glass contains between 50 and below 55 wt. % SiO2.

3. The glass in accordance with claim 2, wherein the glass contains between 53 and below 55 wt. % SiO2.

4. The glass in accordance with claim 1, wherein the glass contains between 21 and 25 wt. % Al2O3.

5. The glass in accordance with claim 4, wherein the glass contains between 21.5 and 23.5 wt. % Al2O3.

6. The glass in accordance with claim 1, wherein the glass contains between 13 and 16 wt. % Na2O.

7. The glass in accordance with claim 6, wherein the glass contains between 13.8 and 15.6 wt. % Na2O.

8. The glass in accordance with claim 1, wherein a molar ratio of SiO2 to Al2O3 lies between 2.5:1 and 4.8:1.

9. The glass in accordance with claim 8, wherein the molar ratio of SiO2 to Al2O3 lies between 3.5:1 and 4.5:1.

10. The glass in accordance with claim 9, wherein the molar ratio of SiO2 to Al2O3 lies between 3.9:1 and 4.2:1.

11. The glass in accordance with claim 1, wherein the glass contains between >0 and 1 wt. % F.

12. The glass in accordance with claim 1, wherein the glass contains between >0.2 and 3.5 wt. % ZnO.

13. The glass in accordance with claim 1, wherein the glass comprises x wt. % Li2O, where 0<x≤1.5.

14. A glass article comprising:
a glass comprising between 47.5 and below 55 wt. % SiO2; between 21 and 27.5 wt. % Al2O3; between 4.5 and 6 wt. % MgO; and between 12 and 16 wt. % Na2O; and wherein a molar ratio of Al2O3 to Na2O lies between 0.94:1 and 1.1:1, wherein the glass has a diffusion layer at least sectionally at its surface, wherein a K content of the glass is increased with respect to a base composition and a Li content and a Na content of the glass are lowered with respect to the base composition, wherein the glass is free of CaO, wherein the glass includes between 1.5 and 2.5 wt. % K2O, wherein the glass includes between >0 and 1 wt. % SnO2, wherein the glass includes between >0 and 0.6 wt. % CeO2, wherein the glass contains between 1.8 and 3.5 wt. % ZrO2, and wherein the glass has a pre-hardening Vickers hardness of between 6400 and 6600 MPa.

15. The glass article in accordance with claim 14, wherein the diffusion layer is between 10 μm and 60 mm thick.

16. The glass article in accordance with claim 14, wherein the glass article is a glass pane.

17. The glass article in accordance with claim 16, wherein the glass pane is shaped as a cover glass positioned and coupled as a display of electronic devices.

18. The glass article in accordance with claim 14, wherein the glass comprises x wt. % Li2O, where 0<x≤1.5.

* * * * *